(12) United States Patent
McGatha et al.

(10) Patent No.: US 8,411,956 B2
(45) Date of Patent: Apr. 2, 2013

(54) ASSOCIATING OPTICAL CHARACTER RECOGNITION TEXT DATA WITH SOURCE IMAGES

(75) Inventors: Jesse McGatha, Sammamish, WA (US); Feras Moussa, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 12/240,670

(22) Filed: Sep. 29, 2008

(65) Prior Publication Data

US 2010/0080493 A1  Apr. 1, 2010

(51) Int. Cl.
G06K 9/18 (2006.01)
(52) U.S. Cl. .......................................... 382/182
(58) Field of Classification Search .................. None
See application file for complete search history.

(56) References Cited

U.S. PATENT DOCUMENTS

| | | | | |
|---|---|---|---|---|
| 5,889,897 | A * | 3/1999 | Medina | 382/310 |
| 6,351,553 | B1 * | 2/2002 | Hayosh | 382/139 |
| 6,385,350 | B1 * | 5/2002 | Nicholson et al. | 382/309 |
| 7,391,917 | B2 * | 6/2008 | Ohta et al. | 382/253 |
| 7,406,201 | B2 | 7/2008 | Heilper et al. | |
| 2003/0177115 | A1 | 9/2003 | Stern et al. | |
| 2004/0042667 | A1 * | 3/2004 | Lee et al. | 382/230 |
| 2004/0190784 | A1 * | 9/2004 | Ozawa et al. | 382/232 |
| 2004/0202386 | A1 * | 10/2004 | Quine | 382/305 |
| 2005/0289182 | A1 | 12/2005 | Pandian et al. | |
| 2006/0062453 | A1 | 3/2006 | Schacht | |
| 2007/0009161 | A1 | 1/2007 | Hollingsworth | |
| 2007/0011149 | A1 | 1/2007 | Walker | |
| 2008/0033969 | A1 * | 2/2008 | Koo et al. | 707/100 |
| 2008/0091713 | A1 * | 4/2008 | Candelore et al. | 707/103 R |
| 2008/0092040 | A1 * | 4/2008 | Nakamura | 715/273 |
| 2008/0279453 | A1 * | 11/2008 | Candelore | 382/176 |
| 2008/0298686 | A1 * | 12/2008 | Okochi | 382/209 |
| 2009/0144614 | A1 * | 6/2009 | Dresevic et al. | 715/239 |

OTHER PUBLICATIONS

"Welcome to SimpleOCR", Retrieved on Aug. 5, 2008, 3 pages. http://www.simpleocr.com/.
"ABBYY FineReader 7.0 Professional Edition", Retrieved on Aug. 5, 2008, 3 pages. http://www.abbyy.com/finereader7/?param=28574.
"Conversion Applications", Retrieved on Aug. 5, 2008, 3 pages. http://www.primerecognition.com/augprime/apps.htm.
"ZySCAN", Last modified Aug. 22, 2007, 2 pages.

* cited by examiner

*Primary Examiner* — Andrew W Johns
*Assistant Examiner* — David F Dunphy
(74) *Attorney, Agent, or Firm* — Alleman Hall McCoy Russell & Tuttle LLP

(57) ABSTRACT

A system and method for associating optical character recognition text data with source images are provided. In one embodiment, an association module of a computing system is configured to receive text data from an OCR engine; associate the text data with a source image; and output associated optical character recognition data including the source image, the text data associated with the source image, and a plurality of referrers. Each referrer of the plurality of referrers may indicate a different image reference. The plurality of referrers are configured to cause the viewer application to output the text data associated with the source image to each instance of the source image that is rendered as part of the fixed-layout document in accordance with the multiple image references.

20 Claims, 4 Drawing Sheets

ASSOCIATING OPTICAL CHARACTER RECOGNITION TEXT DATA WITH SOURCE IMAGES

BACKGROUND

Optical character recognition (OCR) may be used for translating images depicting textual information and documents containing such images into machine-editable text. This machine-editable text may be used, for example, in word processing applications where it may be copied, pasted, or manipulated by a user. Additionally, the machine-editable text may be audibly reproduced through translation to an audio representation of the machine-editable text for the benefit of visually impaired users.

One drawback of OCR engines is that they are processor intensive. Another drawback is that these technologies process each page of the document without regard to whether the page contains a text image that has previously been processed by the OCR engine. As a result, significant processor time is consumed, and multiple different recognitions of the same text image may be produced duplicatively.

SUMMARY

A system and method for associating optical character recognition text data with source images are provided. The system may include a computing device including an association module that is configured to associate text data obtained by an OCR engine with a source image from which the text data was obtained. The text data that is associated with the source image may be utilized by a viewer application to output the text data to a rendered fixed-layout document that includes multiple instances of the source image. In this way, OCR processing time may be reduced where multiple instances of a source image are to be rendered as part of a fixed-layout document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
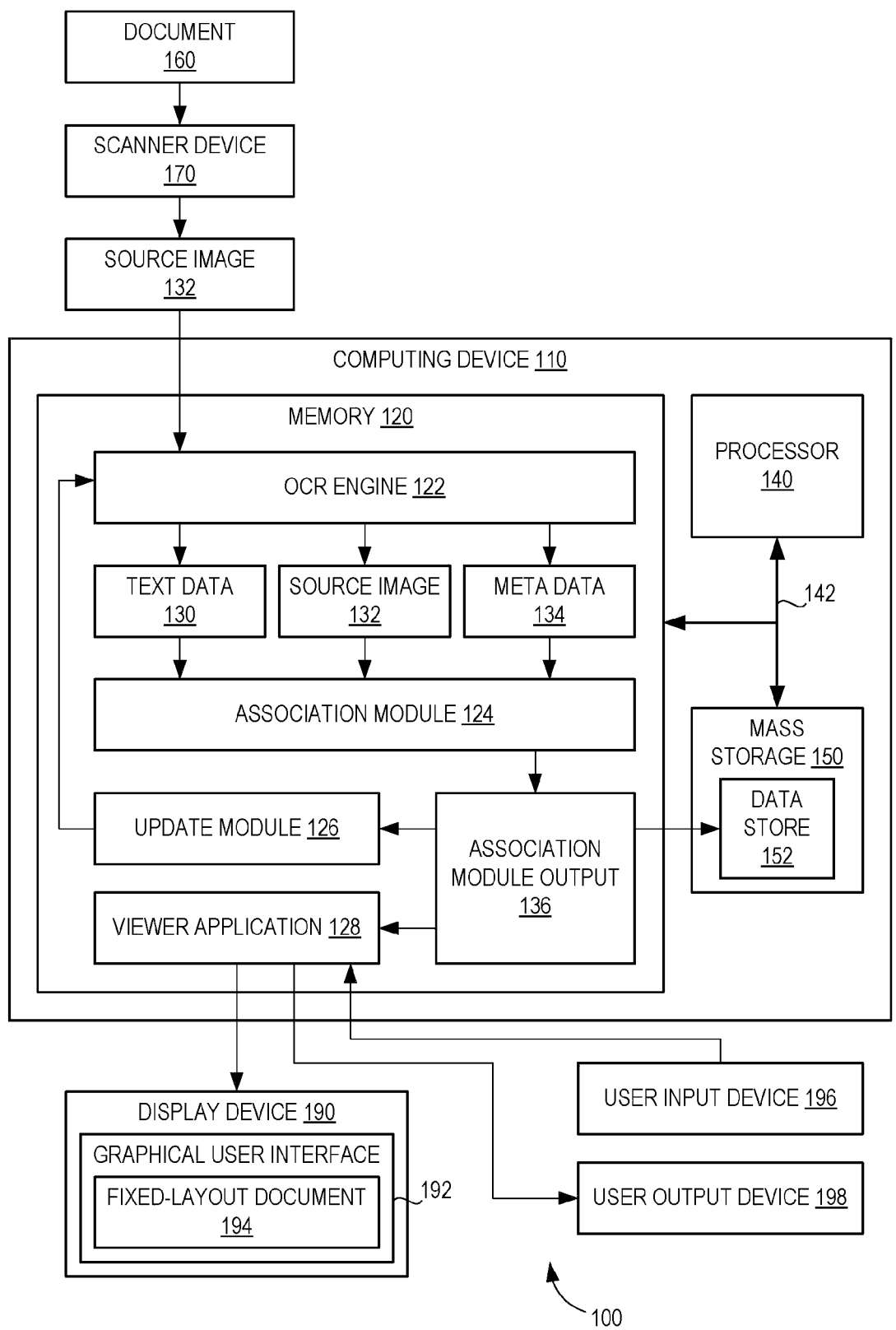
FIG. 1 is a schematic view of an embodiment of a computing system for associating optical character recognition text data with source images.

FIG. 1 shows an example embodiment of a computing system 100 for associating optical character recognition text data with source images. Computing system 100 may include a computing device 110 for use in optical character recognition (OCR), according to which images depicting textual information and/or documents containing such images are translated into machine-editable text.

Computing device 110 may include a processor 140 configured to executed various computer programs stored in mass storage 150 using portions of memory 120. These computer programs may include, for example, an OCR engine 122, association module 124, update module 126, and viewer application 128, which function as described below.

Computing device 110 may interact with other components of computing system 100, including one or more of a scanner device 170, a display device 190, a user input device 196, and a user output device 198. Scanner device 170 may be configured to optically scan one or more of documents 160 and output a source image 132 to computing device 110 representing the one or more scanned documents. In some embodiments, source image 132 may form part of an electronic document to which the OCR process is applied by the OCR engine. This electronic document may include multiple references to the source image if it is present multiple times in the electronic document.

Display device 190 is configured to present a graphical user interface 192. User input device 196 may include one or more of a keyboard, mouse, pointing device, controller, microphone, or other suitable user input device. User output device 198 may include one or more of an audio speaker, a Braille terminal or display, or other suitable user output device. In this way, text data that is obtained through OCR may be presented to a user through an auditory output by the audio speaker or through a tactile output by the Braille terminal in addition to or as an alternative to display device 190.

Figure 2:
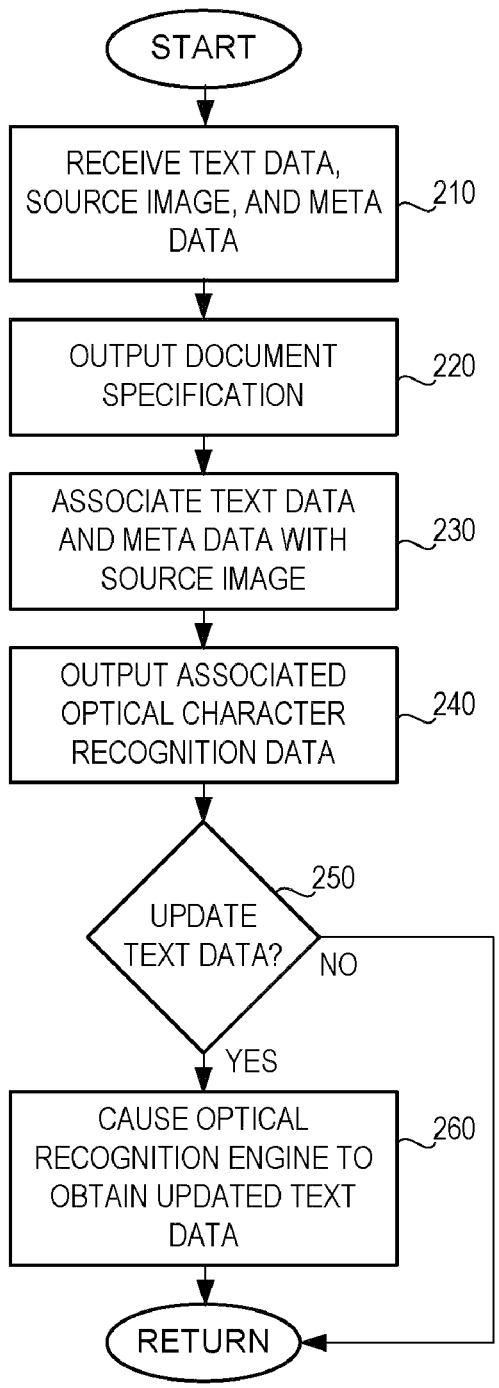
FIG. 2 is a flowchart of an embodiment of a method for associating optical character recognition text data with source images.

FIG. 2 is a flowchart of an embodiment of a method for associating optical character recognition text data with source images. The method of FIG. 2 may be performed by the hardware and software components of computing system 100 described above, or by other suitable hardware and software components. For example, the computer program may include association module 124 that is configured to perform one or more of the steps of the method of FIG. 2.

At 210, the method may include receiving text data 130 from an OCR engine 122, the text data being obtained from a source image by the OCR engine. For example, OCR engine 122 may be configured to receive source image 132 and output one or more of text data 130, source image 132, and metadata 134.

In some embodiments, the method at 210 may further include receiving metadata (e.g., metadata 134) from the OCR engine. The metadata may indicate one or more of a date that the text data was obtained from the source image by the OCR engine and an identifier of the OCR engine. The identifier may include a name of the OCR engine and/or a version of the OCR engine, for example.

At 220, the method may include outputting a document specification defining a fixed-layout document. In some embodiments, the document specification may be outputted by the association module (e.g., association module 124) as a component of an association module output 136 depicted in FIG. 1. A non-limiting example of association module output 136 will be described in greater detail with reference to FIG. 4.

In some embodiments, the fixed-layout document that is defined by the document specification may include a portable document format (PDF) document or an XML paper specification (XPS) document, among other suitable fixed-layout documents. The document specification outputted by the association module may be configured to cause a viewer application (e.g., viewer application 128) to render the fixed-layout document. For example, where the fixed-layout document includes an XPS document, the document specification may include extensible markup language (XML) data.

Figure 4:
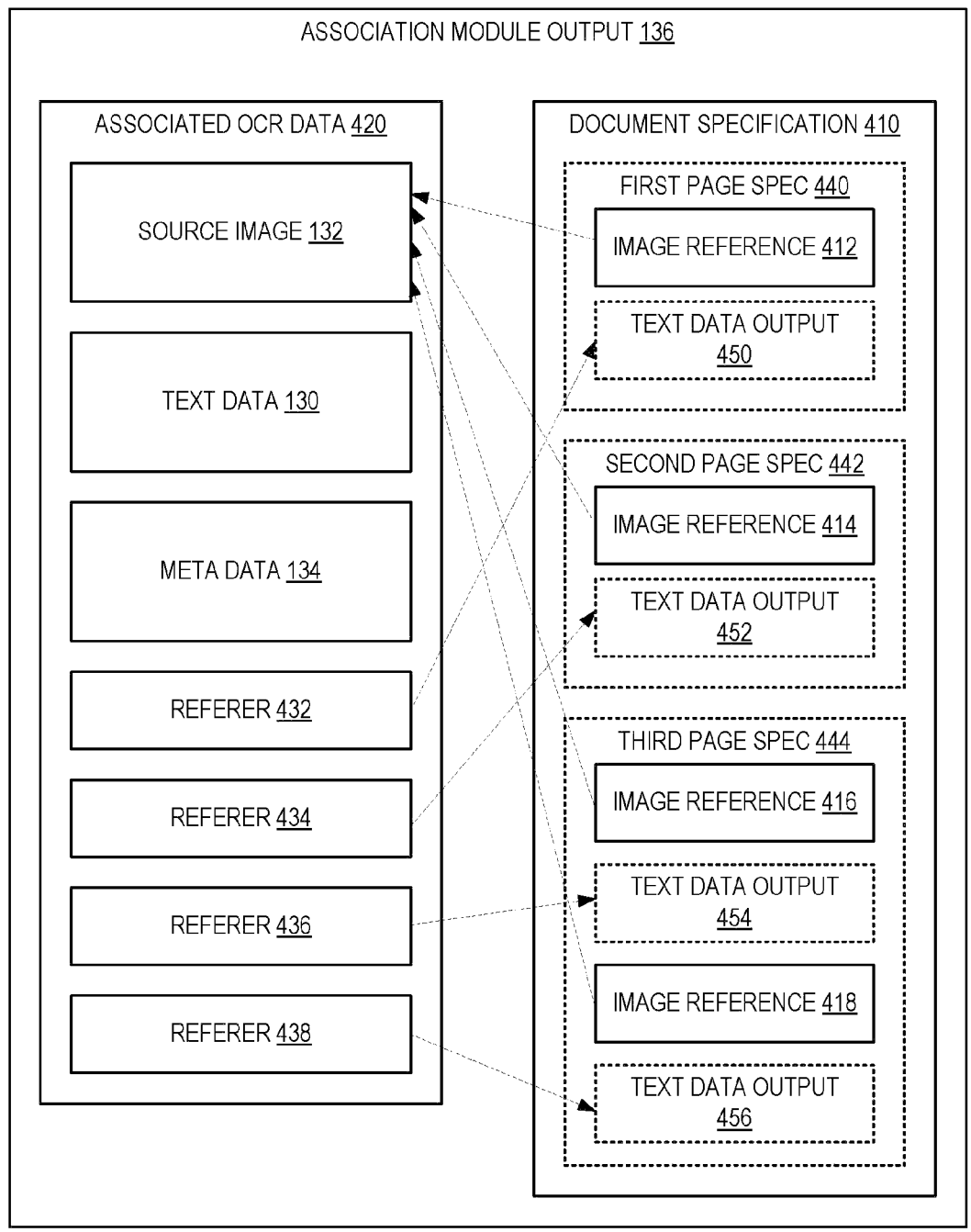
FIG. 4 is a schematic view illustrating an output of an association module of the system of FIG. 1.

Referring also to FIG. 4, document specification 410 is schematically depicted as a component of association module output 136. The document specification may include one or more page specifications that each define a different page of a fixed-layout document. For example, a first page specification 440 may define a first page of the fixed-layout document. Similarly, a second page specification 442 may define a second page of the fixed-layout document and a third page specification 444 may define a third page of the fixed layout document. As such, the document specification may be configured to cause the viewer application to render a fixed-layout document including any suitable number pages as defined by the one or more page specifications. In other embodiments, the document specification may not include page specifications, for example, where the document specification defines a single page fixed-layout document or a dynamically re-flowable document. Further, the one or more page specifications may be wholly integrated into the markup of the document specification in some embodiments.

Further, the document specification may include multiple image references to the source image that are configured to cause a viewer application (e.g., viewer application 128) to render an instance of the source image as part of the fixed-layout document for each image reference of the multiple image references. For example, image reference 412 of document specification 410 may cause the viewer application to render an instance of source image 132 when rendering fixed-layout document 194 of FIG. 1. Similarly, image reference 414 may cause the viewer application to render a second instance of source image 132 as part of the fixed layout document, image reference 416 may cause the viewer application to render a third instance of source image 132 as part of the fixed layout document, and image reference 418 may cause the viewer application to render a fourth instance of source image 132 as part of the fixed layout document. Each page of the two or more pages of the fixed-layout document may include an image reference of the plurality of image references that refer to the source image. In this way, two or more instances of a source image may be rendered as part of the fixed-layout document in accordance with the document specification.

In some embodiments, the source image may be defined by a tagged image file format (TIFF), JPG, BMP, PNG, GIF, or other suitable file format for storing images. A TIFF, for example, may comprise one or more IFDs (Image File Directories). Each of these IFDs may define a particular source image, in the case where the fixed-layout document includes a plurality of different source images. As such, where the source image is defined by a TIFF, each image reference of the multiple image references may refer to a particular IFD of the source image to be rendered as part of the fixed-layout document. For example, image references 412, 414, 416, and 418 may each refer to the same IFD if multiple instances of an image of that IFD are present in the document.

In some embodiments, one or more page specifications and associated pages that are defined by the document specification may each include a plurality of image references that indicate the source image. For example, third page 444 may further include image reference 418 to source image 132. In this way, multiple instances of the source image may be rendered on different pages of the fixed-layout document and on the same page of the fixed-layout document by the viewer application as defined by the document specification and associated page specifications.

In some embodiments, the document specification may define or otherwise allow transparent text data to be overlaid on each instance of the source image that is rendered as part of the fixed-layout document. In this embodiment, the plurality of referrers may be configured to cause the viewer application to overlay the text data transparently over each instance of the source image as the transparent text data. The transparent text data may be selectable by a user via a cursor. For example, the transparent text data may be copied to a clipboard by a user of the computing device, where it may be pasted to another document and manipulated as machine-editable text. As another example, the transparent text data may be used for vocalization by a text-to-speech accessibility application. In some embodiments, the text-to-speech accessibility application may be included as part of the viewer application.

At 230, the method may include associating the text data with the source image. Referring again to FIG. 4, text data 130 and source image 132 are depicted in an associated state as components of associated OCR data 420.

In some embodiments, the association module may be configured to associate the text data with the source image by assigning the text data and source image to a data container. As will be described in greater detail with reference to step 240, the association module may be configured to output the associated OCR data by storing the source image and the text data in the data container. As such, associated OCR data 420 of FIG. 4 may represent the data container.

In other embodiments, the association module may be configured to associate the text data received at 210 with the source image by storing the text data within an image file of the source image. As such, the associated OCR data 420 of FIG. 4 may represent the image file including source image 132 and text data 130 stored within the image file.

In some embodiments, at 230, the association module may be configured to associate the metadata received at 210 with one or more of the source image and the text data obtained from the source image.

FIG. 4 depicts metadata 134, source image 132, and text data 130 in an associated state as components of associated OCR data 420. In some embodiments, the association module may associate the metadata with one or more of the source image and the text data by storing the metadata in a file container with the source image and/or text data, or by storing the metadata in an image file that includes the source image and/or the text data.

In some embodiments, the association module may store the text data alongside the source image in a manner defined by an implementer of the computing system. For example, a file name convention may be used whereby the source image that is stored at C:\Temp\dog.jpg may be associated with the text data stored at C:\Temp\dog.jpg.ocr.

In some embodiments, text data, meta data, and plurality of referrers may be encapsulated by the following example markup:

```
<OcrData OcrEngine="SomeEngine"
OcrEngineVersion="2.0.3" GenerationDate="08/01/2008 12:59:04">
    <Referer Location="/Documents/1/Pages/1.fpage"
Name="OrganizationChart" />
    <Referer Location="/Documents/1/Pages/1.fpage"
Name="OrganizationChart" />
    <TextResults>
```

```
    <!-XML Text Data 130 such as text data output 450, 452,
454 inserted here -->
        </TextResults>
    </OcrData>
```

The <OcrData> element in the above example may be configured to store the metadata associated with the <RefererLocation> element, such as OCR engine version number, OCR timestamp, etc. The <RefererLocation> element may be optional and may be used to identify a location in the document specification where the text data of the <TextResults> element may be outputted by the viewer application. This redundancy, when stored within the document specification markup, allows a viewer application that is unaware of the OCR engine and association module processes to nonetheless view the results of the OCR processes.

Furthermore, storing the results of the OCR process in the <TextResults> element allows for viewer applications to be able to discover the OCR results (e.g., text data) of an image, even if redundant markup is not utilized. The <RefererLocation> element also allows an update module, which will be described in greater detail below, to find each page of the fixed-layout document that contains the OCR-processed source image to facilitate re-processing of the source image and replacement of text data that correlates to the contents of the <TextResults> element with updated text data.

With respect to XPS, it should be appreciated that the text data may be stored as a copy within that page, within an element identified by a unique XML id, as noted by the above described <Name> attribute. However, it should be appreciated that the herein described processes may be applied to binary representation, such as a specific location identifier within a PDF document object model (DOM). The Location attribute may be defined as a URI in the above example, but may be a page number or any other identifier of the page that contains an instance of the source image. The <TextResults> element may include the actual text data and layout information extracted from the OCR engine for this particular image.

At 240, the method may include outputting the associated OCR data (e.g., as associated OCR data 420) including the source image and the text data associated with the source image.

In some embodiments, the association module may be further configured to output the associated OCR data further including the metadata. As previously described with reference to step 210, the metadata may indicate one or more of a date that the text data was obtained from the source image by the OCR engine and an identifier of the OCR engine.

In some embodiments, the associated OCR data outputted by the association module may further include a plurality of referrers. FIG. 4 depicts an example of associated OCR data 420 including referrers 432, 434, 436, and 438. In some embodiments, each referrer of the plurality of referrers may indicate a different image reference of the multiple image references as indicated by the respective arrows of FIG. 4.

For example, referrer 432 may indicate image reference 412 to which text data 130 may be output as text data output 450. Similarly, referrer 434 may indicate image reference 414 to which text data 130 may be output as text data output 452, referrer 436 may indicate image reference 416 to which text data 130 may be output as text data output 454, and referrer 438 may indicate image reference 418 to which text data 130 may be output as text data output 456.

In this way, the plurality of referrers may be configured to cause the viewer application (e.g., viewer application 128) to output the text data associated with the source image to each instance of the source image that is rendered as part of the fixed-layout document in accordance with the multiple image references. For example, text data 130 may be output to third page 444 as text output 454 associated with image reference 416 and as text output 456 associated with image reference 418. Note that in other embodiments, text data 130 may be output to the rendered page of the fixed-layout document rather than to each instance of the source image. As such, text output 454 and text output 456 may form a common text output for third page 444 in some embodiments.

It should be appreciated in some embodiments, each referrer of the plurality of referrers may indicate a particular page of the document specification, whereby the viewer application may be responsible for outputting the text data and/or metadata associated with the source image to an instance of the source image that is rendered on the particular page. As such, it should be appreciated that text data and/or metadata may be outputted to a specified tag located in the document specification, or may be outputted to a particular page of the fixed-layout document as defined by the page specification, where the viewer application may assist with outputting the text data in accordance with a suitable protocol of that viewer application.

At 250, the method may include determining whether to update the text data based on the metadata received at 210. In some embodiments, an update module (e.g., update module 126) of the computing device may be configured to judge whether the metadata indicates that an OCR process was performed using the most suitable OCR engine that is accessible by the computing device.

In one example, the update module may compare a first OCR engine identifier indicated by the metadata to a second OCR engine identifier associated with an OCR engine that is accessible by the computing device. In another example, the update module may compare a date that the OCR process was performed (as indicated by the metadata) to a look-up table stored in memory at the computing device or at a remote location in order to determine whether to update the text data. For example, where the OCR engine has been updated or upgraded, or where the date that the OCR process was performed satisfies a pre-determined condition, the update module may determine that the text data is to be updated.

If the text data is to be updated, the update module may cause an OCR engine (i.e., a new or updated OCR engine) to obtain updated text data from the source image. In some embodiments, the method that was applied to the text data may be similarly applied to the updated text data. For example, the association module may receive the updated text data from the new or updated OCR engine. Additionally, the association module may receive updated metadata from the new or updated OCR engine.

In some embodiments, the association module may associate the updated text data and updated metadata with the source image by replacing the text data with the updated text data and by replacing the metadata with the updated metadata at the associated OCR data. For example, text data 130 of associated OCR data 420 and text data output 450, 452, 454, and 456 of FIG. 4 may be replaced by the updated text data that is received from the new or updated OCR engine. Similarly, metadata 134 of associated OCR data 420 may be replaced by the updated metadata that is received from the new or updated OCR engine.

Figure 3:
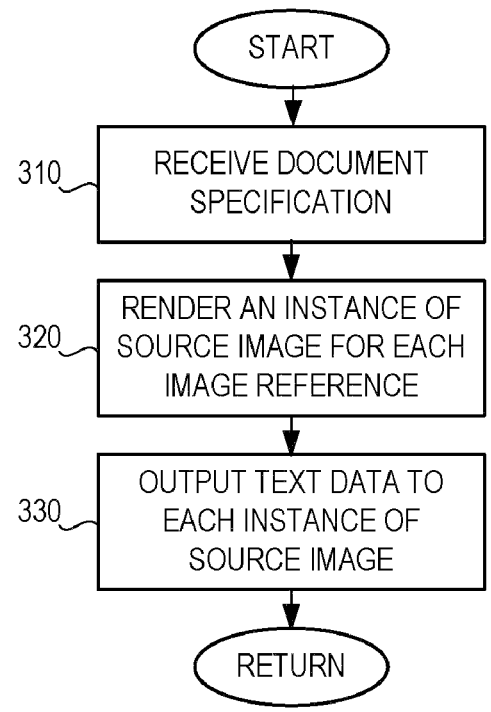
FIG. 3 is a flowchart an embodiment of a method for rendering a fixed-layout document.

FIG. 3 is a flowchart of an embodiment of a method for a method for rendering a fixed-layout document. At 310, the method may include receiving a document specification defining the fixed-layout document. The document specification received by the viewer application at 310 may include the document specification output by the association module at step 220 of FIG. 2.

For example, the document specification received at 310 may include multiple image references to the source image of the associated OCR data outputted at 240 of FIG. 2. As such, the associated OCR data may include one or more of the source image, text data associated with the source image, metadata, and a plurality of referrers. Each referrer of the plurality of referrers may indicate a different image reference of the multiple image references as previously described with reference to FIG. 4. In other embodiments, each referrer of the plurality of referrers may indicate a different page or page specification of the fixed-layout document.

At 320, the method may include rendering an instance of the source image as part of the fixed-layout document for each image reference of the multiple image references by retrieving the source image from the associated OCR data for each image reference of the multiple image references. For example, referring also to FIG. 4, the viewer application may utilize image reference 412 to retrieve or access source image 132 that is associated with associated OCR data 420. Similarly, the viewer application may utilize image reference 414 to retrieve source image 132 from associated OCR data 420. In some embodiments, the associated OCR data may be retrieved from the data store 152 of mass storage 150.

At 330, the method may include outputting the text data associated with the source image to each instance of the source image that is rendered as part of the fixed-layout document by retrieving the text data from the associated OCR data as indicated by the plurality of referrers. For example, the viewer application may output text data 130 to text data output 450 as indicated by referrer 432.

In some embodiments, the method at 330 may further include, outputting metadata associated with the source image to each instance of the source image that is rendered as part of the fixed-layout document by retrieving the metadata from the associated OCR data as indicated by the plurality of referrers. As previously described with reference to step 210, the metadata may indicate one or more of a date that the text data was obtained from the source image by the OCR engine and an identifier of the OCR engine.

Figure 5:
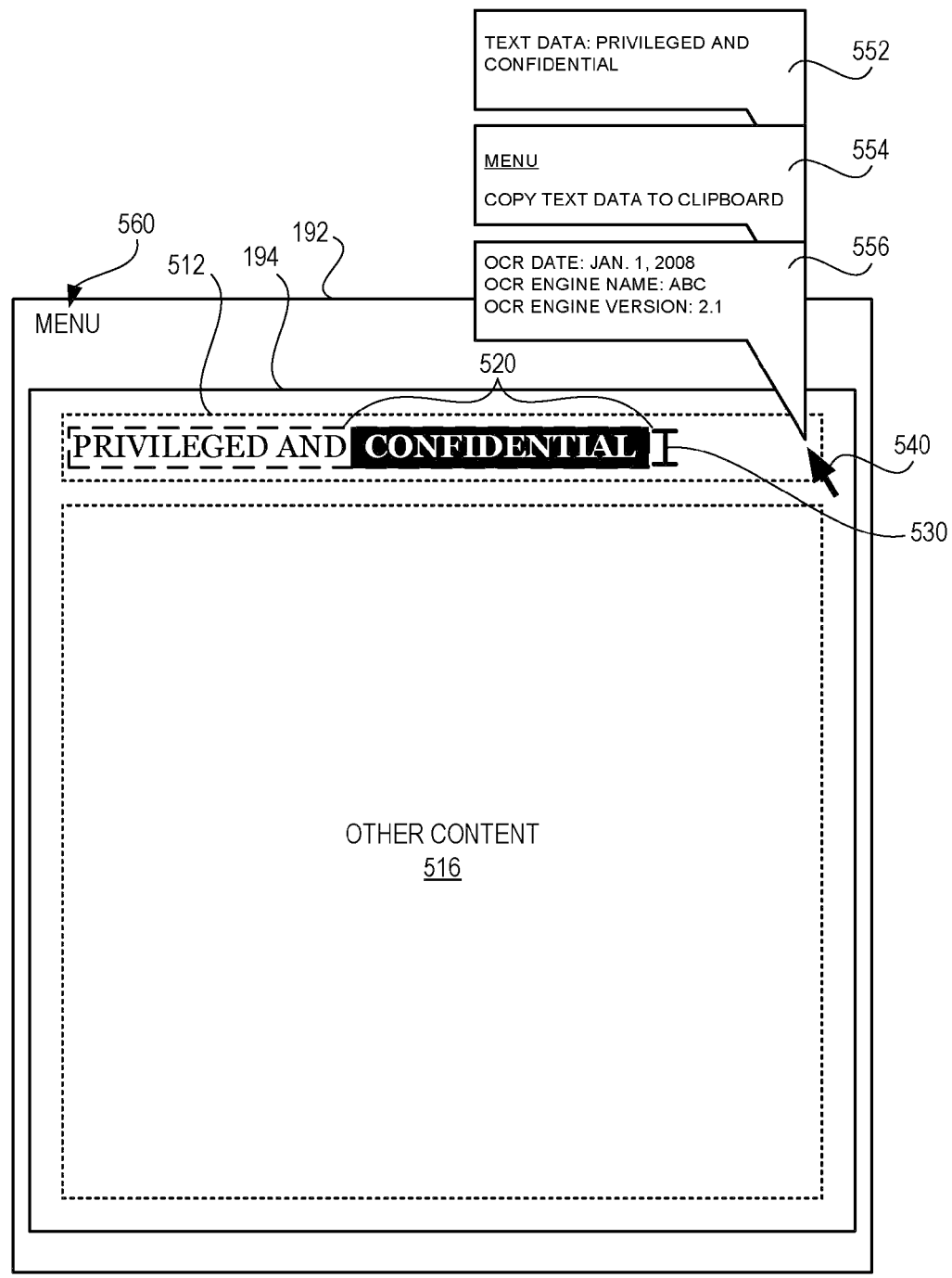
FIG. 5 is a schematic view of a fixed-layout document rendered from output as in FIG. 4, by a viewer application of the computing system of FIG. 1.

FIG. 5 shows an example embodiment of the fixed-layout document 194 that was rendered by a viewer application such as viewer application 128 shown in FIG. 1. Graphical user interface 192 may present fixed-layout document 194 via a display device. As previously described, fixed-layout document 194 may refer to a portable document format (PDF) document or an XML paper specification (XPS) document, among other suitable fixed-layout documents.

An instance 512 of the source image is rendered as part of the fixed-layout document along with other content 516. In this particular example, instance 512 of the source image depicts textual information that includes: "PRIVILEGED AND CONFIDENTIAL". As one example, instance 512 is a header of a multipage fixed-layout document, whereby each page includes a similar header with a different instance of the source image.

A transparent text data 514 is shown schematically overlaying instance 512 of the source image that is rendered as part of the fixed-layout document. In some embodiments, the transparent text data may be rendered by the viewer application directly from a font. The viewer application is shown outputting the text data as the transparent text data where it has been selected via cursor 530 at 520. The text data once selected via the cursor may be copied and pasted to another document where it may be optionally manipulated as machine-editable text or translated to an audio representation of the text data.

In some embodiments, transparent text data 514 may be omitted, whereby the text data may be outputted to the rendered image using an alternate approach. For example, a cursor 540 may be instead operated by a user to select the instance of the image to obtain the text data as indicated at 552 or to obtain a menu that provides copying function of the text data as indicated at 554.

In some embodiments, metadata may be outputted to the rendered image. For example, cursor 540 may be operated by a user to select the instance of the image to obtain the metadata as indicated at 556. It should be appreciated that were the referrers of the associated OCR data instead refer to a particular page of the fixed-layout document rather than the image reference, cursor 540 may select the page itself (e.g., via graphical user interface 192) and/or a menu icon 560 to access the associated text data and metadata.

In each of the above examples, the text data and the metadata may be outputted by the viewer application responsive to the document specification and the associated OCR data that collectively comprise the association module output to thereby reduce future processing time of the source image.

It will be appreciated that the computing device(s) described herein may be virtually any suitable computing device, such as a mainframe computer, personal computer, laptop computer, portable data assistant (PDA), computer-enabled wireless telephone, networked computing device, printing device, or other suitable computing device, and may be connected to each other via computer networks, such as the Internet. These computing devices typically include a processor and associated volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable storage media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing system for associating optical character recognition text data with source images in an electronic document, the computing system configured to execute a computer program, comprising:
   a processor and associated memory, the processor being configured to execute an association module using portions of the memory, the association module being configured to:
      receive text data from an optical character recognition engine, the text data being obtained from a source image by the optical character recognition engine, where the entire source image is duplicated on more than one page of the electronic document and a plurality of times on at least one page of the electronic document;

output a document specification defining a fixed-layout document, the document specification including multiple image references to the entire source image duplicated on more than one page of the electronic document and a plurality of times on at least one page of the electronic document, where each image reference of the multiple image references is configured to cause a viewer application to render an instance of the entire source image as part of the fixed-layout document each time the image reference appears in the document, and where the document specification defines transparent text data to be overlaid on each instance of the entire source image that is rendered as part of the fixed-layout document;

associate the text data with the source image; and output associated optical character recognition data including the source image, the text data associated with the source image, and a plurality of referrers, each referrer of the plurality of referrers indicating a different image reference of the multiple image references;

wherein the plurality of referrers are configured to cause the viewer application to output the text data associated with the source image to each instance of the entire source image that is rendered as part of the fixed-layout document in accordance with the multiple image references, and wherein the plurality of referrers are configured to cause the viewer application to output the transparent text data for selection by a user.

2. The computing system of claim 1, where the association module is further configured to output the associated optical character recognition data further including metadata that indicates one or more of a date that the text data was obtained from the source image by the optical character recognition engine and an identifier of the optical character recognition engine.

3. The computing system of claim 2, further comprising:
an update module configured to:
determine whether to update the text data based on the metadata;
if the text data is to be updated, cause a new or updated optical character recognition engine to obtain updated text data from the source image; and
associate the updated text data with the source image by replacing the text data with the updated text data at the associated optical character recognition data.

4. The computing system of claim 1, where the association module is configured to associate the text data with the source image by assigning the text data and source image to a data container; and
where the association module is configured to output the associated optical character recognition data by storing the source image and the text data in the data container.

5. The computing system of claim 1, where the association module is configured to associate the text data with the source image by storing the text data within an image file of the source image.

6. The computing system of claim 1, where the document specification defines two or more pages of the fixed-layout document, where each page of the two or more pages includes an image reference of the multiple image references.

7. The computing system of claim 1, where selection by a user is via a cursor or vocalization by a text-to-speech accessibility application.

8. The computing system of claim 1, where the source image is defined by a tagged image file format or by a particular image file directory of the tagged image file format.

9. The computing system of claim 8, where each image reference of the multiple image references defines a particular image file directory of the entire source image to be rendered as part of the fixed-layout document.

10. A method for associating optical character recognition text data with source images in an electronic document, comprising:

receiving text data from an optical character recognition engine, the text data being obtained from a source image by the optical character recognition engine, where the entire source image is duplicated on more than one page of the electronic document and a plurality of times on at least one page of the electronic document;

outputting a document specification defining a fixed-layout document, the document specification including multiple image references to the entire source image is duplicated on more than one page of the electronic document and a plurality of times on at least one page of the electronic document, where each image reference of the multiple image references refers to a same image file of the source image stored in memory on a computing system and where each image reference of the multiple image references is configured to cause a viewer application to render an instance of the entire source image as part of the fixed-layout document each time the image reference appears in the document;

associating the text data with the source image; and outputting associated optical character recognition data including the source image, the text data associated with the source image, and a plurality of referrers, each referrer of the plurality of referrers indicating a different image reference of the multiple image references, and where outputting the document specification includes outputting the document specification further defining transparent text data to be overlaid on each instance of the entire source image that is rendered as part of the fixed-layout document;

wherein the plurality of referrers are configured to cause the viewer application to output the text data associated with the source image to each instance of the entire source image that is rendered as part of the fixed-layout document in accordance with the multiple image references, and wherein the plurality of referrers are configured to cause the viewer application to output the text data as the transparent text data for selection by a user.

11. The method of claim 10, where outputting the associated optical character recognition data further includes outputting the associated optical character recognition data further including metadata, the metadata indicating one or more of a date that the text data was obtained from the source image by the optical character recognition engine and an identifier of the optical character recognition engine.

12. The method of claim 11, further comprising:
determining whether to update the text data based on the metadata;
if the text data is to be updated, causing an optical recognition engine to obtain updated text data from the source image; and
associating the updated text data with the source image by replacing the text data with the updated text data.

13. The method of claim 10, where associating the text data with the source image includes assigning the text data and source image to a data container; and where outputting the associated optical character recognition data includes storing the source image and the text data in the data container.

14. The method of claim 10, where associating the text data with the source image includes storing the text data within the image file of the source image.

15. The method of claim 10, where outputting the document specification includes outputting the document specification further defining two or more pages of the fixed-layout document, where each page of the two or more pages includes an image reference of the multiple image references.

16. The method of claim 10, where selection by a user is via a cursor or vocalization by a text-to-speech accessibility application.

17. The method of claim 10, where the source image is defined by a tagged image file format or by a particular image file directory of the tagged image file format.

18. The method of claim 10, where each image reference of the multiple image references defines a particular image file directory of the entire source image to be rendered as part of the fixed-layout document.

19. A method for rendering a fixed-layout document, the method comprising:

receiving a document specification defining a fixed-layout document, the document specification including multiple image references to a source image of associated optical character recognition data, where the entire source image is duplicated on more than one page of the electronic document and a plurality of times on at least one page of the document, where each image reference of the multiple image references refers to the same image file of the source image stored in memory on a computing system and where each image reference of the multiple image references is configured to cause a viewer application to render an instance of the entire source image as part of the fixed-layout document each time the image reference appears in the document, and where the document specification defines transparent text data to be overlaid on each instance of the entire source image that is rendered as part of the fixed-layout document;

the associated optical character recognition data including the source image, text data associated with the source image, and a plurality of referrers, each referrer of the plurality of referrers indicating a different image reference of the multiple image references;

rendering an instance of the entire source image as part of the fixed-layout document for each image reference of the multiple image references by retrieving the source image from the associated optical character recognition data for each image reference of the multiple image references; and outputting the text data associated with the source image to each instance of the entire source image that is rendered as part of the fixed-layout document by retrieving the text data from the associated optical character recognition data as indicated by the plurality of referrers, wherein the plurality of referrers are configured to cause the viewer application to output the text data as the transparent text data for selection by a user.

20. The method of claim 19, further comprising, outputting metadata associated with the source image to each instance of the entire source image that is rendered as part of the fixed-layout document by retrieving the metadata from the associated optical character recognition data as indicated by the plurality of referrers;

where the metadata indicates one or more of a date that the text data was obtained from the source image by an optical character recognition engine and an identifier of the optical character recognition engine.

* * * * *